(12) United States Patent
Busaba et al.

(10) Patent No.: US 8,930,950 B2
(45) Date of Patent: Jan. 6, 2015

(54) MANAGEMENT OF MIGRATING THREADS WITHIN A COMPUTING ENVIRONMENT TO TRANSFORM MULTIPLE THREADING MODE PROCESSORS TO SINGLE THREAD MODE PROCESSORS

(75) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Wappingers Falls, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 13/353,550

(22) Filed: Jan. 19, 2012

(65) Prior Publication Data

US 2013/0191832 A1     Jul. 25, 2013

(51) Int. Cl.
G06F 9/46      (2006.01)
G06F 9/48      (2006.01)
G06F 9/50      (2006.01)

(52) U.S. Cl.
CPC ............ *G06F 9/4856* (2013.01); *G06F 9/5088* (2013.01); *G06F 9/505* (2013.01)
USPC ............................ 718/102; 718/104; 718/105

(58) Field of Classification Search
None
See application file for complete search history.

(56) References Cited

U.S. PATENT DOCUMENTS

| | | | |
|---|---|---|---|
| 6,996,745 B1* | 2/2006 | Shaylor | 714/24 |
| 7,155,600 B2 | 12/2006 | Burky et al. | |
| 7,698,504 B2 | 4/2010 | Cypher et al. | |
| 2004/0215939 A1 | 10/2004 | Armstrong et al. | |
| 2006/0130062 A1* | 6/2006 | Burdick et al. | 718/100 |
| 2006/0242389 A1 | 10/2006 | Browning et al. | |
| 2009/0150893 A1* | 6/2009 | Johnson et al. | 718/104 |
| 2009/0172424 A1* | 7/2009 | Cai et al. | 713/300 |
| 2010/0269115 A1* | 10/2010 | Arimilli et al. | 718/103 |
| 2011/0088041 A1 | 4/2011 | Alameldeen et al. | |
| 2012/0198469 A1* | 8/2012 | Bellows et al. | 718/104 |
| 2013/0047011 A1* | 2/2013 | Dice et al. | 713/320 |
| 2014/0026146 A1* | 1/2014 | Jahagirdar et al. | 718/105 |

FOREIGN PATENT DOCUMENTS

EP      2159687 A1      3/2010

OTHER PUBLICATIONS

"z/Architecture—Principles of Operation," IBM Publication No. SA22-7832-08, Ninth Edition, Aug. 2010.
International Search Report and Written Opinion for PCT/EP2013/050301, dated Apr. 17, 2013, pp. 1-8.
Office Action for U.S. Appl. No. 13/681,494 dated Feb. 21, 2014, pp. 1-18.

* cited by examiner

*Primary Examiner* — Mengyao Zhe
*Assistant Examiner* — Tammy Lee
(74) *Attorney, Agent, or Firm* — Margaret McNamara, Esq.; Blanche E. Schiller, Esq.; Heslin Rothenberg Farley & Mesiti P.C.

(57) ABSTRACT

Threads of a computing environment are managed to improve system performance. Threads are migrated between processors to take advantage of single thread processing mode, when possible. As an example, inactive threads are migrated from one or more processors, potentially freeing-up one or more processors to execute an active thread. Active threads are migrated from one processor to another to transform multiple threading mode processors to single thread mode processors.

20 Claims, 4 Drawing Sheets

MANAGEMENT OF MIGRATING THREADS WITHIN A COMPUTING ENVIRONMENT TO TRANSFORM MULTIPLE THREADING MODE PROCESSORS TO SINGLE THREAD MODE PROCESSORS

BACKGROUND

An aspect of the invention relates, in general, to processing within a computing environment, and in particular, to facilitating management of threads within the computing environment.

A thread typically exists within a process, and a process may have multiple threads that share resources, such as memory. A thread is considered the smallest unit of processing that can be scheduled by an operating system. A thread can execute on a processor with no other threads executing thereon or on a processor with other threads. In the case where the thread is the only thread executing on the processor, the processor is said to be executing in single thread mode. However, in the case in which the thread is executing with other threads, the processor is said to be in simultaneous multithreading (SMT) mode.

In simultaneous multithreading mode, hardware resources are shared among multiple software threads executing on a machine. Each thread appears to have its own complete set of architecture hardware. Furthermore, in superscalar processors, it is common to have multiple execution pipelines that can be shared among the threads being dispatched into the hardware. Though SMT provides an efficiency of hardware, allowing multiple threads to rapidly share the execution resources available, it comes with a performance cost of the individual threads. It is common for a thread that is alone on a processor to execute more rapidly than if that thread shared resources with another thread. This is because with SMT there may be resource contention issues between threads, and often a processor in SMT mode must limit what resources are available to each thread. For example, a processor with two floating point pipelines might only be able to use one floating point pipeline for a particular thread in SMT mode even if no other thread is using the second floating point pipeline. In contrast, if the processor was not in SMT mode, that thread can make use of both floating point pipelines.

BRIEF SUMMARY

Shortcomings of the prior art are overcome and additional advantages are provided through the provision of a computer system for facilitating management of threads in a computing environment. The computer system includes a memory; and a processor in communications with the memory, wherein the computer system is configured to perform a method. The method includes, for instance, detecting, by a hardware controller of the computing environment, a change in state of a first processor, wherein the state relates to at least one thread of the first processor; and based on the detecting, providing an indication by the hardware controller to an entity of the computing environment that one or more threads of the first processor are to be migrated from the first processor to at least one second processor to enable at least one of the first processor or another processor to transform from a multithreading processor mode to a single thread processor mode.

Methods and computer program products relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, a capability is provided for managing threads of a computing environment. In one example, threads are migrated between processors in order to take advantage of single thread processor mode, when possible. For example, inactive threads (e.g., sleeping threads, waiting threads, etc.) or threads entering an inactive state may be migrated from a first processor to at least one second processor to enable either the first processor or another processor to transform from multithreading mode to single thread mode. This on-demand thread migration allows overall system performance to increase due to more threads running in single thread processor mode.

Figure 1A:
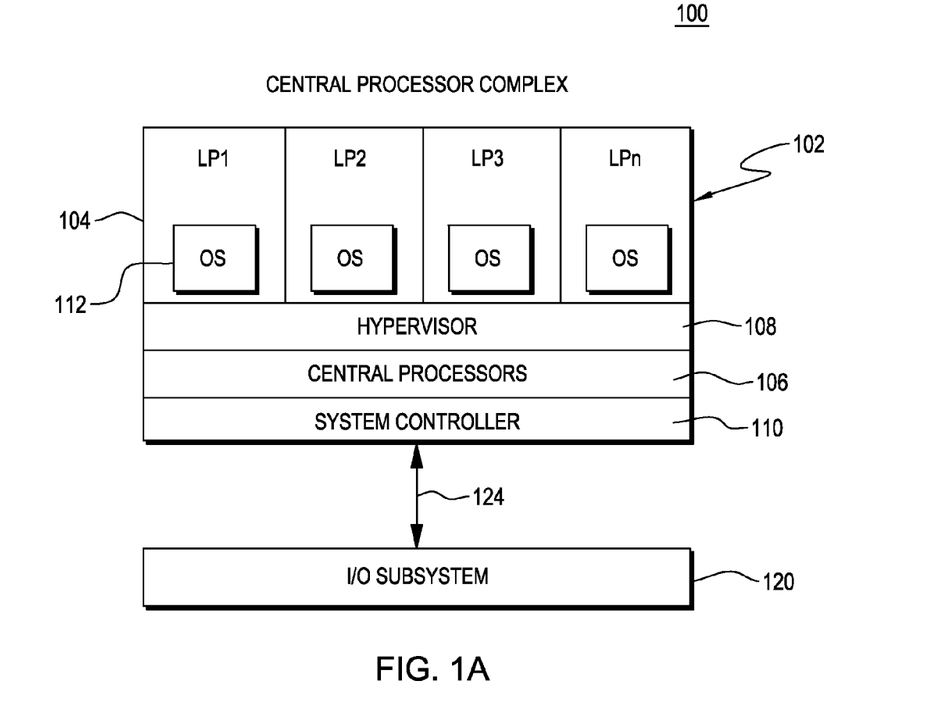
FIG. 1A depicts one embodiment of a computing environment to incorporate and use one or more aspects of the present invention.

One embodiment of a computing environment to incorporate and use one or more aspects of the present invention is described with reference to FIG. 1A. A computing environment 100 is based, for instance, on the z/Architecture® offered by International Business Machines Corporation, Armonk, N.Y. The z/Architecture® is described in an IBM Publication entitled, "z/Architecture—Principles of Operation," IBM® Publication No. SA22-7832-08, Ninth Edition, August 2010, which is hereby incorporated herein by reference in its entirety. In one example, a computing environment based on the z/Architecture® includes a System z® server offered by International Business Machines Corporation, Armonk, N.Y. IBM®, z/Architecture® and System z®, as well as z/OS® mentioned below, are registered trademarks of International Business Machines Corporation, Armonk, N.Y. Other names used herein may be registered trademarks, trademarks or product names of International Business Machines Corporation or other companies.

As one example, computing environment 100 includes a central processor complex (CPC) 102 coupled to an input/output (I/O) subsystem 120. Central processor complex 102 includes, for instance, one or more partitions 104 (e.g., logical partitions LP1-LPN), one or more central processors 106, a hypervisor 108 (e.g., a logical partition manager), and a system controller 110, each of which is described below.

Each logical partition 104 is capable of functioning as a separate system. That is, each logical partition can be independently reset, initially loaded with an operating system, if desired, and operate with different programs. An operating system or application program running in a logical partition appears to have access to a full and complete system, but in reality, only a portion of it is available. A combination of hardware and firmware keeps a program in a logical partition from interfering with a program in a different logical partition. This allows several different logical partitions to operate on a single processor or multiple physical processors in a time-sliced manner.

As used herein, firmware includes, e.g., the microcode, millicode, and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In this particular example, each logical partition has a resident operating system 112, which may differ for one or more logical partitions. In one embodiment, operating system 112 is the z/OS® operating system, offered by International Business Machines Corporation, Armonk, N.Y. Further, in this example, each logical partition has assigned thereto a portion of system main storage (memory), which is referred to as a zone.

A logical partition 104 includes one or more logical processors. Each logical processor may have a central processor 106 permanently allocated thereto, or there may be a pool of central processors 106 available for dynamic allocation to any group of logical processors, possibly spanning multiple logical partitions 104.

Logical partitions 104 are managed by hypervisor 108 implemented, for instance, by firmware running on processors 106. Logical partitions 104 and hypervisor 108 each comprise one or more programs residing in respective portions of main storage associated with the central processor. One example of hypervisor 108 is the Processor Resource/Systems Manager™ (PR/SM), offered by International Business Machines Corporation, Armonk, N.Y.

Central processors 106 are coupled to, but separate from, system controller 110. System controller 110 is, for instance, a hardware component that controls access to memory and caches within the central processors, and communicates between the central processors and input/output subsystem 120. The system controller is responsible for the queuing, serialization, and execution of requests made by the central processors and the I/O subsystem. In one example, it is responsible for sending commands to particular central processors and/or broadcasting commands to multiple central processors. The system controller may be a centralized component or its functions may be distributed. The system controller is not a processor or core; for example, it does not execute user applications. Instead, it is the communications mechanism between the I/O subsystem and the central processors.

Figure 1B:
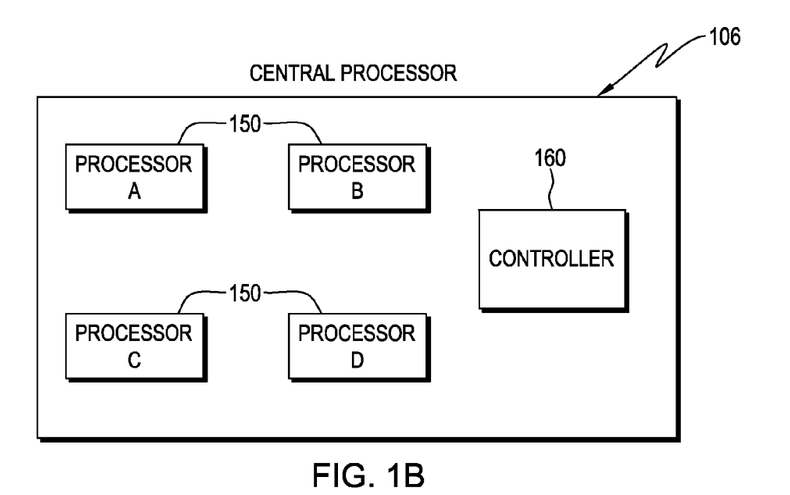
FIG. 1B depicts further details of the central processors of FIG. 1A, in accordance with an aspect of the present invention.

Further details regarding central processors 106 are described with reference to FIG. 1B. In one example, a central processor 106 includes one or more cores or processors 150, which are the physical processors that are allocated to one or more logical partitions. A central processor is considered part of a node, and each node includes one or more central processors. A logical partition can span nodes in which one or more central processors from one node and one or more central processors from another node can be assigned to the logical partition.

Further, in accordance with an aspect of the present invention, central processor 106 includes a controller 160 (e.g., hardware controller) used to monitor the processors, and in particular, the threads executing on the processors, as described in further detail herein.

Figure 2A:
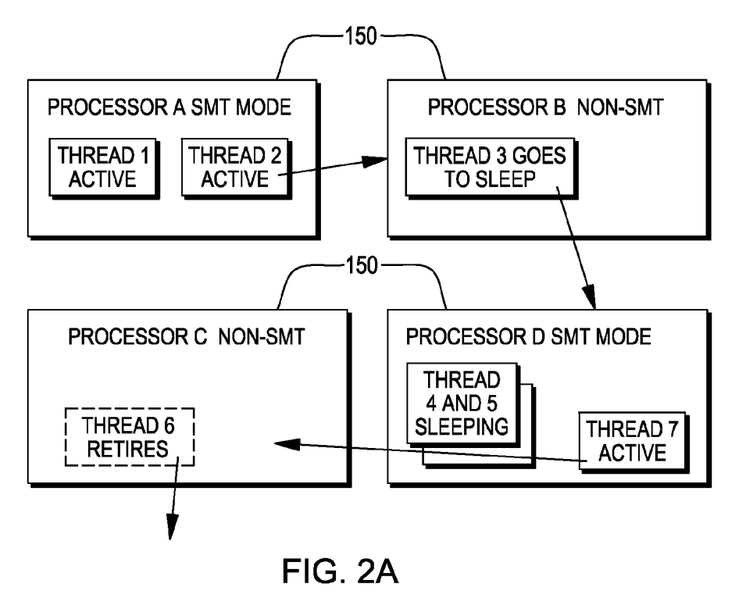
FIG. 2A depicts one embodiment of multiple processors executing multiple threads, in accordance with an aspect of the present invention.

As depicted in FIG. 2A, one or more of the processors can be executed in simultaneous multithreading (SMT) mode and one or more of the processors may be executed in non-simultaneous multithreading (non-SMT) mode, also referred to as single thread mode. For instance, in FIG. 2A, Processors A and D are executing in simultaneous multithreading mode and Processors B and C are executing in non-simultaneous multithreading mode.

In accordance with an aspect of the present invention, a technique is provided for migrating a processor from simultaneous multithreading mode to single thread mode in order to improve system performance. This is described in further detail with reference to FIGS. 2A-2B and FIG. 3. In one example, it is controller 160 (FIG. 1B) that detects that a change is to be made and provides an indication of that change, as described in further detail below. In a further example, the controller can be resident on one or more of the processors.

Continuing with FIG. 2A, in this particular example, four processors are depicted, including Processor A executing in SMT mode, Processor B executing in non-SMT mode, Processor C executing in non-SMT mode, and Processor D executing in SMT mode. Processor A has two active threads, Threads 1 and 2; Processor B has a thread that is changing from an active state to an inactive state (e.g., idle or sleeping state), Thread 3; Processor C has a thread that is retiring, Thread 6; and Processor D has two sleeping threads, Threads 4 and 5, and an active thread, Thread 7. Controller 106 monitors the processors and obtains information regarding the threads on the processors. For example, a hypervisor may keep controller 106 informed of the activity state of a thread (e.g., by an indicator or bit), or the thread itself may set a wait state bit in the processor (e.g., in a Program Status Word) that is then communicated to the controller. In a further example, a hardware component, e.g., a counter, is used to keep count of instructions being dispatched and/or completed on the thread, and a timer observes this counter. If the counter is not updated in a particular amount of time (e.g., 1 microsecond, ½ or 1/10 of a microsecond, etc.), it indicates there is no activity on the thread. This indication is provided to the controller.

From this information, the controller provides an indication of one or more threads that are to be moved from one or more processors to one or more other processors to improve system performance. To make this determination, controller 106 analyzes various factors including, but not limited to, the types of threads (e.g., active, inactive) executing on the processors and whether movement of a thread would enable a processor to execute in single thread mode. One embodiment of this analysis is described with reference to FIG. 3.

Figure 3:
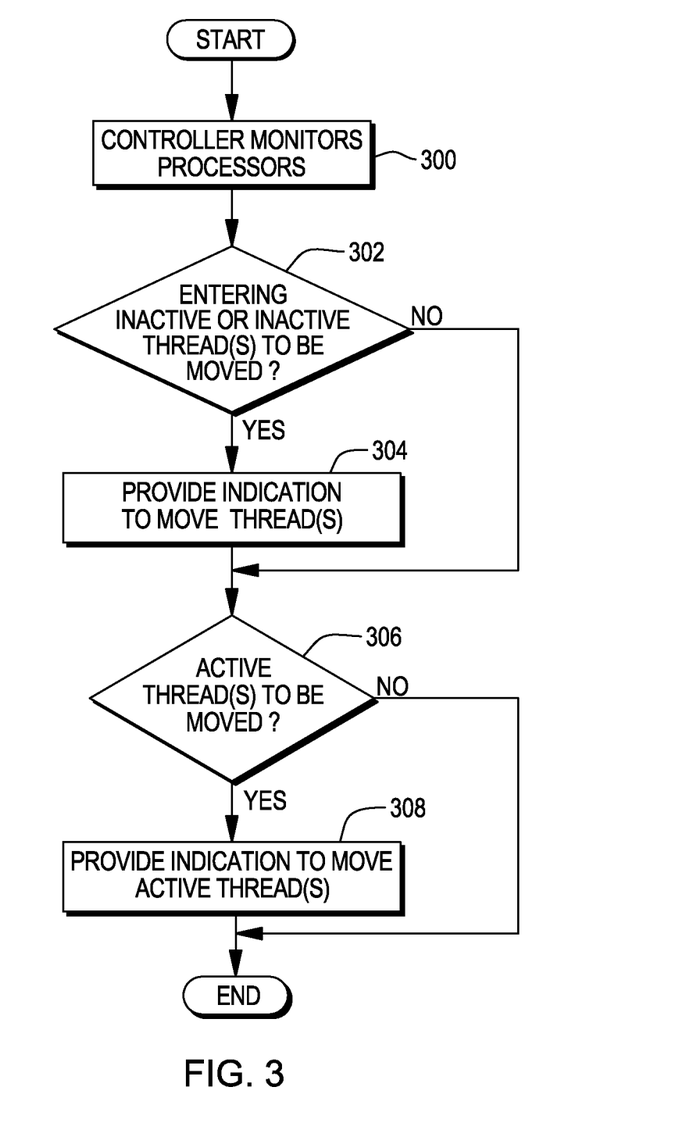
FIG. 3 depicts one embodiment of the logic associated with swapping threads from one processor to another, in accordance with an aspect of the present invention.

Referring to FIG. 3, in one embodiment, the controller monitors the processors, STEP 300, and obtains information regarding the types of threads running on the processors. For example, it detects that Processor A has two active threads; Processor B has one thread entering the inactive state; Processor C has a retiring thread; and Processor D has two inactive threads and one active thread.

A determination is made as to whether there are any inactive threads or threads entering an inactive state that can be moved, INQUIRY 302. For instance, the controller recognizes that the only thread on Processor B is in the process of entering the inactive (e.g., idle or sleeping) state, and if that thread is moved, then one of the threads (e.g., Thread 2) from Processor A can be moved to Processor B so that both Processor A and Processor B are executing in non-SMT mode. Therefore, the controller provides an indication either to the operating system of Processor B or to a hypervisor or any other control mechanism that Thread 3 is to be moved to another processor, STEP 304. In this example, it recommends that it be moved to Processor D, since Processor D already includes sleeping threads.

Thereafter, or if there are no inactive threads or threads entering inactive state to be moved, the controller determines whether there are any active threads to be moved, INQUIRY 306. In this determination, the controller considers whether there are any processors that are not executing any threads, and therefore, could accept a thread to execute. In this particular example, after Thread 3 is moved to Processor D, then Processor B has no threads to execute, and therefore, a thread, such as Thread 2, can be moved from Processor A to Processor B. Further, when Thread 6 retires on Processor C, then Processor C also includes no executing threads, and therefore, Thread 7 which is the only active thread on Processor D can be moved to Processor C. Thus, an indication is provided to the one or more operating systems, the hypervisor or other control mechanism, to move the active threads, STEP 308. Other examples also exist.

Responsive to an indication to move a thread, either an inactive thread, a thread entering an inactive state or an active thread, the operating system, hypervisor or control mechanism moves the thread. In one example, thread migration begins with stopping the thread, assuming it is active. Then, a millicode routine, hypervisor routine or hardware controller, as examples, on the source processor can then be used to store the thread state information out to memory. Once complete, a millicode routine, hypervisor routine or hardware controller, as examples, on the target processor is then used to read the thread information out of memory into the target processor. Once the thread information is loaded onto the target processor, the thread is then returned to its current state and processing continues on the target processor.

Returning to INQUIRY 306, if there are no active threads to be moved, processing is complete. This processing may be performed on a periodic basis (e.g., every X minutes or seconds, every update to the controller, etc.) continually, or based on a trigger, as examples.

While one embodiment of this technique considers consolidating inactive threads or threads entering inactive state on one or more processors and attempting to have active threads execute in single thread mode, when possible, other considerations may be taken into account. Further, in other embodiments, threads may be moved for performance reasons even if the target processor is not going to execute in non-SMT mode, after the move. Many factors may be considered without departing from the spirit of one or more aspects of the present invention.

Figure 2B:
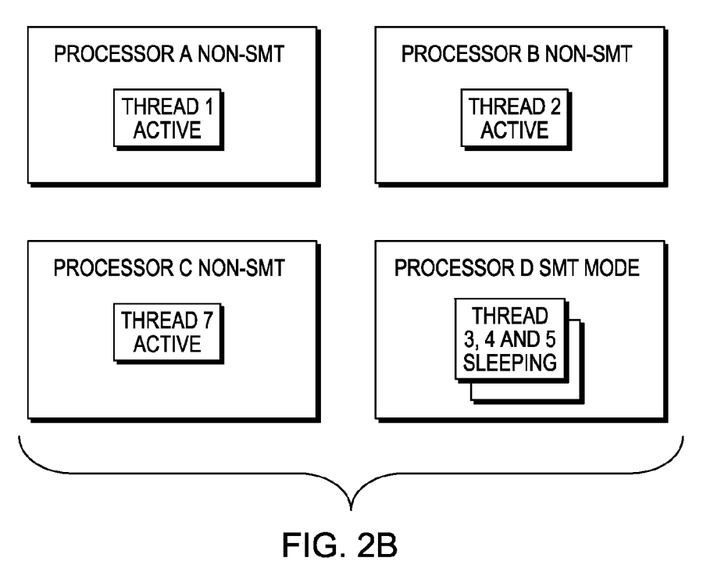
FIG. 2B depicts one example of the processors of FIG. 2A after one or more aspects of the present invention have been applied to the processors, in accordance with an aspect of the present invention.

Responsive to performing the moves, in this particular example, the processors include the threads as indicated in FIG. 2B. For example, Processor A is now executing in non-SMT mode and has one active thread, Thread 1; Processor B is also executing in non-SMT mode and has one active thread, Thread 2; Processor C, which is also executing in non-SMT mode has one active thread, Thread 7; and Processor D is executing in SMT mode and has three sleeping threads, Threads 3, 4 and 5.

By swapping the threads as indicated, overall system performance is maximized by enabling multiple processors to run in single thread mode. Threads in a sleep state or entering a sleep state (or other inactive state), which is entered into when a thread completes its current task and is waiting for an external interrupt to wake it to execute another task (e.g., command), can be swapped out of cores with active threads allowing the processors those threads are executing on to switch out of SMT mode, and thus, improve overall system performance. Furthermore, active threads can be moved from one processor to another, if the one processor has multiple active threads and the second processor has no active threads because, for instance, the previously active thread just terminated.

In a further embodiment, if two threads are thrashing on the same hardware (e.g., floating point unit), the thrashing can be used as a stimulus to activate thread migration. Hardware thrashing detectors can signal to the controller or hypervisor that the threads should be migrated to a different core to improve system performance. Other criteria may also be used to migrate a thread. Although, in examples herein, the policy for rebalancing threads is based on performance, the policy for rebalancing can also be based on other criteria, such as thermal concerns.

In yet a further embodiment, thread migration may be used to migrate a processor from single thread mode to multithreading mode or to add another thread to a processor already in multithreading mode. For instance, controller 106 may monitor the memory access characteristic of each thread on a processor to determine if multiple threads on multiple different processors share the same memory access characteristics such that system performance can be improved by migrating the threads with similar memory access characteristics to the same processor. Other considerations may also be taken into account.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 4:
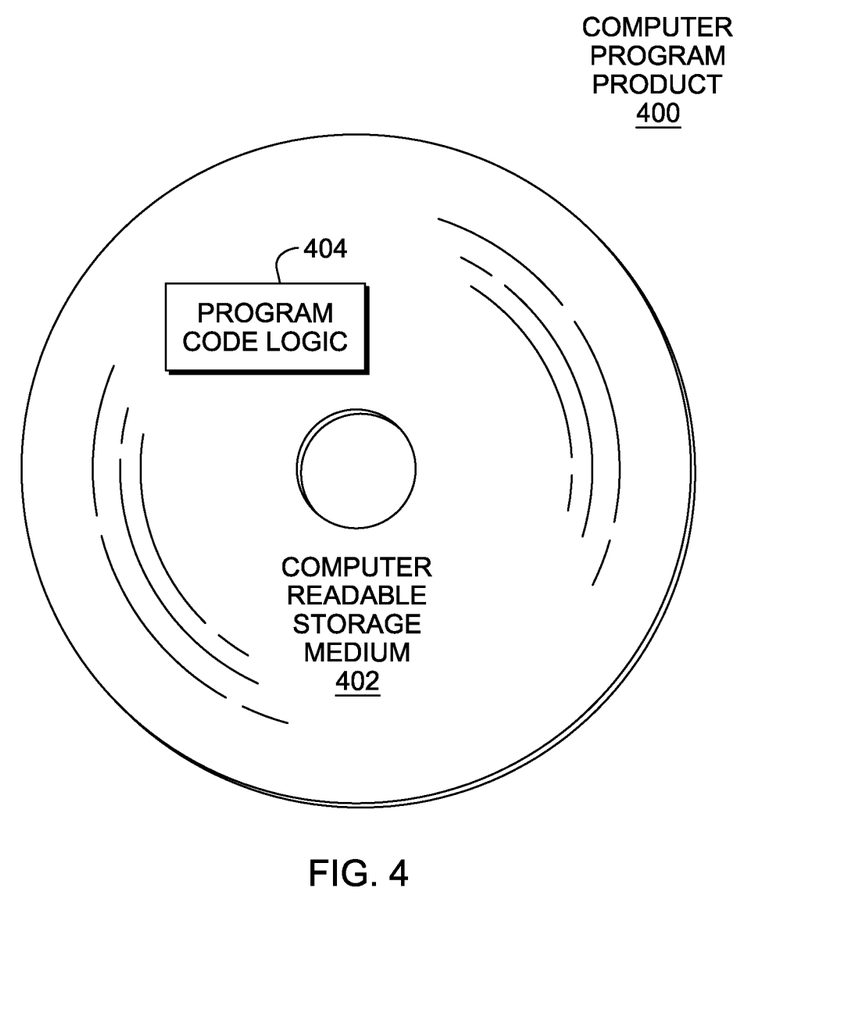
FIG. 4 depicts one embodiment of a computer program product incorporating one or more aspects of the present invention.

Referring now to FIG. 4, in one example, a computer program product 400 includes, for instance, one or more non-transitory computer readable storage media 402 to store computer readable program code means or logic 404 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, a central processor may include more or less processors than described herein. Yet further, processors may include more or less threads than described herein. Yet further, the processors need not be part of a central processor. Moreover, in another embodiment, threads may be moved from a processor of one central processor to a processor of another central processor. Still further, other factors may be taken into consideration when deciding whether a thread is to be moved. Many other changes may also be made.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer system for migrating threads between a plurality of processors of a computing environment, said computer system comprising:
   a memory; and
   a processor in communications with the memory, wherein the computer system is configured to perform a method, said method comprising:
      monitoring, by a hardware controller of the computing environment, a plurality of processors to obtain information regarding a plurality of threads on the plurality of processors, the monitoring detecting a change in a state of a thread on a processor of the plurality of processors, the change in state indicating a change from an active state to a state other than the active state;
      determining, based on detecting the change in the state of the thread, whether at least one thread of the plurality of threads is to be migrated from at least one processor to at least one other processor to transform one or more processors of the plurality of processors from a multithreaded processing mode to a single thread processor mode, wherein the determining analyzes a plurality of factors including:
         types of threads executing on the plurality of processors, the types of threads including one or more of active, inactive, retiring, or entering inactive threads; and
         whether movement of the at least one thread transforms the one or more processors to single thread processor mode; and
      based on the determining, providing an indication by the hardware controller to an entity of the computing environment that the at least one thread is to be migrated from the at least one processor to the at least one other processor to enable at least one processor of the one or more processors to transform from a multithreading processor mode to a single thread processor mode.

2. The computer system of claim 1, wherein the providing the indication comprises providing an indication that the thread changing from the active state is to be migrated, and wherein subsequent to migration, the processor from which the thread is migrated has no threads thereon enabling an active thread to be migrated there such that the processor from which the thread is migrated and another processor from which the active thread is migrated are processing in a single thread processor mode.

3. The computer system of claim 1, wherein the detecting the change in state of the thread comprises detecting that the thread is entering an inactive state.

4. The computer system of claim 3, wherein the thread entering the inactive state comprises the thread entering a sleeping state.

5. The computer system of claim 1, wherein the entity comprises a hypervisor of the computing environment or an operating system of a processor of the computing environment.

6. The computer system of claim 1, wherein the method further comprises:

detecting by the hardware controller that an active thread is to be moved from one processor to another processor; and providing an indication to the entity or another entity that the active thread is to be moved.

7. The computer system of claim 6, wherein the detecting that the active thread is to be moved is based on a migration of one or more threads from the another processor resulting in the another processor having no threads.

8. The computer system of claim 7, wherein the detecting that the active thread is to be moved is further based on a determination that movement of the active thread transforms the one processor to a single thread processor mode.

9. The computer system of claim 1, wherein the method further comprises moving the at least one thread from the at least one processor to the at least one other processor.

10. The computer system of claim 9, wherein the method further comprises moving one or more active threads, if any, from a selected processor of the at least one other processor, wherein the selected processor exclusively includes inactive threads or threads entering an inactive state.

11. A computer program product for migrating threads between a plurality of processors of a computing environment, said computer program product comprising:

a non-transitory computer readable storage medium readable by a processing circuit and storing instructions for execution by the processing circuit for performing a method comprising:

monitoring, by a hardware controller of the computing environment; a plurality of processors to obtain information regarding a plurality of threads on the plurality of processors, the monitoring detecting a change in a state of a thread on a processor of the plurality of processors, the change in state indicating a change from an active state to a state other than the active state;

determining, based on detecting the change in the state of the thread, whether at least one thread of the plurality of threads is to be migrated from at least one processor to at least one other processor to transform one or more processors of the plurality of processors from a multithreaded processing mode to a single thread processor mode, wherein the determining analyzes a plurality of factors including:

types of threads executing on the plurality of processors, the types of threads including one or more of active, inactive, retiring, or entering inactive threads; and whether movement of the at least one thread transforms the one or more processors to single thread processor mode; and based on the determining, providing an indication by the hardware controller to an entity of the computing environment that the at least one thread is to be migrated from the at least one processor to the at least one other processor to enable at least one processor of the one or more processors to transform from a multithreading processor mode to a single thread processor mode.

12. The computer program product of claim 11, wherein the providing the indication comprises providing an indication that the thread changing from the active state is to be migrated, and wherein subsequent to migration, the processor from which the thread is migrated has no threads thereon enabling an active thread to be migrated there such that the processor from which the thread is migrated and another processor from which the active thread is migrated are processing in a single thread processor mode.

13. The computer program product of claim 11, wherein the method further comprises:

detecting by the hardware controller that an active thread is to be moved from one processor to another processor; and providing an indication to the entity or another entity that the active thread is to be moved.

14. The computer program product of claim 13, wherein the detecting that the active thread is to be moved is based on a migration of one or more threads from the another processor resulting in the another processor having no threads.

15. The computer program product of claim 14, wherein the detecting that the active thread is to be moved is further based on a determination that movement of the active thread transforms the one processor to a single thread processor mode.

16. The computer program product of claim 11, wherein the detecting the change in state of the thread comprises detecting that the thread is entering an inactive state.

17. The computer program product of claim 16, wherein the thread entering the inactive state comprises the thread entering a sleeping state.

18. The computer program product of claim 11, wherein the entity comprises a hypervisor of the computing environment or an operating system of a processor of the computing environment.

19. The computer program product of claim 11, wherein the method further comprises moving the at least one thread from the at least one processor to the at least one other processor.

20. The computer program product of claim 19, wherein the method further comprises moving one or more active threads, if any, from a selected processor of the at least one other processor, wherein the selected processor exclusively includes inactive threads or threads entering an inactive state.

* * * * *